United States Patent [19]

Golden

[11] Patent Number: 5,939,354

[45] Date of Patent: Aug. 17, 1999

[54] PEROVSKITE-TYPE METAL OXIDE COMPOUNDS AND METHOD FOR PREPARING THE COMPOUNDS

[75] Inventor: Stephen J. Golden, Santa Barbara, Calif.

[73] Assignee: Catalytic Solutions, Inc., Santa Barbara, Calif.

[21] Appl. No.: 08/630,603

[22] Filed: Apr. 10, 1996

[51] Int. Cl.[6] .............. B01J 23/00; B01J 23/32; B01J 23/40; B01J 23/58

[52] U.S. Cl. .............. 502/525; 502/302; 502/303; 502/304; 502/306; 502/324; 502/326; 502/328

[58] Field of Search ................... 502/525, 302, 502/303, 304, 306, 324, 326, 328

[56] References Cited

U.S. PATENT DOCUMENTS

| | | | |
|---|---|---|---|
| 3,865,752 | 2/1975 | Remeika et al. | 252/462 |
| 3,865,923 | 2/1975 | Stephens | 423/213.2 |
| 3,884,837 | 5/1975 | Remeika et al. | 252/462 |
| 3,897,367 | 7/1975 | Lauder | 252/462 |
| 3,929,670 | 12/1975 | Kudo et al. | 252/455 |
| 4,001,371 | 1/1977 | Remeika et al. | 423/213.2 |
| 4,049,583 | 9/1977 | Lauder | 252/466 PT |
| 4,107,163 | 8/1978 | Donohue | 423/263 |
| 4,126,580 | 11/1978 | Lauder | 252/462 |
| 4,151,123 | 4/1979 | McCann, III | 252/462 |
| 4,748,143 | 5/1988 | Tabata | 502/304 |
| 5,318,937 | 6/1994 | Jovanovic et al. | 502/303 |
| 5,380,692 | 1/1995 | Nakatsuji et al. | 502/525 |

FOREIGN PATENT DOCUMENTS 0468127  1/1992  European Pat. Off. ......... B01J 23/10

OTHER PUBLICATIONS

Ohbayashi et al., Crystallographic, Electric and Thermochemical Properties of the Perovskite–Type $Ln_{1-x}Sr_xCoO_3$ (Ln: Lanthanoid Element), *Japanese Journal of Applied Physics*, vol. 13, No.. 1, Jan. 1974, 1–7.
Taylor, *Automobile Catalytic Converters*, Springer–Verlag, 1984, pp. 4, 5, 11.
Heck and Farrauto, Automotive Catalysts, *Automotive Engineering*, Feb. 1996, 93–96.
Narula et al., Materials Chemistry Issues Related to Advanced Materials Applications in the Automotive Industry, *Chem. Mater*, vol. 8, No. 5, 1996, 984–1003.
Voorhoeve et al., Defect Chemistry and Catalysis in Oxidation and Reduction Over Perovskite–Type Oxides, *Annals New York Academy of Science*, 1976, pp. 3–21.
Viswanathan, CO Oxidation and NO Reduction on Perovskite Oxides, *Catal. Rev.–Sci. Eng.*, 34(4), 337–354 (1992).
Burton & Garten, *Advanced Materials in Catalysis*, Academic Press, New York, 1997, 129–179.

Nakamura et al., Reduction–Oxidation and Catalytic Properties of $La_{1-x}Sr_xCoO_3$, *Journal of Catalysis*, 83, 151–159 (1983).
Nitadori & Misono, Catalytic Properties of $La_{1-x}A'_xFeO_3$ (A' = $Sr_1$ Ce) and $La_{1-x}Ce_xCoO_3$, *Journal of Catalysis*, 93, 459–466 (1985).
Nitadori et al., Catalytic Properties of $La_{1-x}A'xMnO_3$ (A' = $Sr_1$ Ce, Hf), *Journal of Catalysis*, 98, 221–228 (1986).
Kirk–Othmer, *Encyclopedia of Chemical Technology*, 3ed., vol. 19, 833–838 (1982).
Marcilly et al, Preparation of Highly Dispersed Mixed Oxides and Oxide Solid Solutions by Pyrolysis of Amorphous Organic Precursors, *J. Am. Ceram. Soc.*, 53 (1970) 56.
Libby, Promising Catalyst for Auto Exhaust, *Science*, 171 (1971) 499.
Voorhoeve et al, Rare–Earth Oxides of Manganese and Cobalt Rival Platinum for the Treatment of Carbon Monoxide in Auto Exhaust, *Science*, 177 (Jul. 1972) 353.
Voorhoeve et al, Rare–Earth Manganites: Catalysts with Low Ammonia Yield in the Reduction of Nitrogen Oxides, *Science*, 180 (Apr. 1973).
Voorhoeve et al., Perovskite Oxides: Materials Science in Catalysis, *Science*, 195 (Mar. 1977) 827.
Johnson et al, Preparation of High Surface Area Substituted $LaMnO_3$ Catalysts, *Ceramic Bulletin*, 55 (1976) 520.
Asamitsu, A structural phase transition induced by an external magnetic field, *Nature* 373 (Feb. 1995) 407.
Chakraborty et al, Low–temperature synthesis of ultrafine $LaO.84MnO3$ powder by an autoignition process, *J. Mat. Res.* 9 (1994) 986.
Habashi, F., *The Discovery and Industrialization of the Rare Earths*, Unocal[76]Molycorp, (1994), reprinted from CIM Bulletin Jan. and Feb., 1994.
Sakaguchi et al, Electrocatalytic Activity and Oxygen Adsorption Property of Perovskite–type Oxides, *Electrochimica Acta* 35 (1990) 65.
Tseung et al, Preparation and Characterisation of High Surface Area Semiconducting Oxides, *J. Mater. Sci* 5 (1970) 604.

*Primary Examiner*—Glenn Caldarola
*Assistant Examiner*—In Suk Bullock
*Attorney, Agent, or Firm*—Loeb & Loeb LLP

[57] ABSTRACT

A perovskite-type catalyst consisting essentially of a metal oxide composition. The metal oxide composition is represented by the general formula $A_{a-x}B_xMO_b$, in which A is a mixture of elements originally in the form of single phase mixed lanthanides collected from Bastnasite; B is a divalent or monovalent cation; M is at least one element selected from the group consisting of elements of an atomic number of from 23 to 30, 40 to 51, and 73 to 80; a is 1 or 2; b is 3 when a is 1 or b is 4 when a is 2; and x is a number defined by $0 \leq x < 0.7$. Methods for preparing the perovskite-type catalyst are also described.

57 Claims, 4 Drawing Sheets

PEROVSKITE-TYPE METAL OXIDE COMPOUNDS AND METHOD FOR PREPARING THE COMPOUNDS

BACKGROUND OF THE INVENTION

1. Field of the Invention

This invention relates generally to perovskite-type catalysts which are useful in carbon monoxide oxidation, hydrocarbon oxidation, nitrogen oxide reduction and oxidation of trapped soot particles. In addition, this invention relates to perovskite-type materials displaying so-called giant magnetoresistance (GMR). Furthermore, this invention relates to a method of making perovskite-type catalysts and materials.

2. Description of Related Art

Perovskite compositions are nominally designated as $ABO_3$, in which A represents a rare earth metal such as lanthanum, neodymium, cerium or the like, and B represents a transition metal such as cobalt, iron, nickel or the like. It is known in the art that perovskite-type materials are useful for the catalytic oxidation and reduction reactions associated with the control of automotive exhaust emissions. It is also known that perovskite materials (powders, single crystals and thin films) containing Mn on the B-site show giant magnetoresistance effect (GMR), such that on application of a magnetic field, the electrical resistivity of the material drops drastically due to a field-induced switching of the crystal structure. For this reason, GMR has attracted considerable attention for device applications such as magnetic recording heads.

Several techniques have been used to produce perovskite-type catalyst materials for the treatment of exhaust gases from internal combustion engines. The ability of such materials to effectively treat internal combustion exhaust gases depends on the three-way activity of the material, i.e. the capability for nitrogen oxide reduction, carbon monoxide oxidation and unsaturated and saturated hydrocarbon oxidation. The following patents describe such materials and techniques in the three-way catalysis application: U.S. Pat. Nos. 3,865,752; 3,865,923; 3,884,837; 3,897,367; 3,929,670; 4,001,371; 4,107,163; 4,126,580; 5,318,937. In addition to these patents there are numerous studies reported in the scientific literature relating to the fabrication and application of perovskite-type oxide materials in the treatment of internal combustion exhaust emissions. These references include Marcilly et al, J. Am. Ceram. Soc., 53 (1970) 56; Tseung et al J. Mater. Sci 5 (1970) 604; Libby Science, 171 (1971) 449; Voorhoeve et al Science, 177 (1972) 353; Voorhoeve et al Science, 180 (1973); Johnson et al Thermochimica Acta, 7 (1973) 303; Voorhoeve et al Mat. Res. Bull., 9 (1974) 655; Johnson et al Ceramic Bulletin, 55 (1976) 520; Voorhoeve et al Science, 195 (1977) 827; Baythoun et al J. Mat. Sci., 17 (1982) 2757; Chakraborty et al J. Mat. Res. 9 (1994) 986. Much of this literature and the patent literature frequently mention that the A-site of the perovskite compound can be occupied by any one of a number of lanthanide elements (e.g. Sakaguchi et al Electrochimica Acta 35 (1990) 65). In all these cases, the preparation of the final compound utilizes a single lanthanide, e.g. $La_2O_3$. Meadowcroft in Nature 226 (1970) 847, refers to the possibility of using a mixed lanthanide source for the preparation of a low-cost perovskite material for use in an oxygen evolution/reduction electrode. U.S. Pat. No. 4,748,143 refers to the use of an ore containing a plurality of rare earth elements in the form of oxides for making oxidation catalysts.

In addition to the above mentioned techniques, other techniques have been developed for the production of perovskite materials containing Mn on the B-site which show giant magnetoresistance effect (GMR). Such materials are generally made in forms of powders, single crystals, and thin films. A common technique is the growth of single-crystals from a phase-pure perovskite source, see, for example, Asamitsu in Nature 373 (1995) 407. All such techniques use a phase-pure perovskite compound with a single lanthanide on the A-site, in addition to an alkaline earth dopant. An example of such phase-pure perovskite compound is $La_{1-x}Sr_xMnO_3$.

It is also known in the art that it is difficult and expensive to prepare individual rare earth compounds such as individual lanthanides. Thus, the cost is high for making perovskite-type materials with a single lanthanide on the A-site. Therefore, a need exists for using low-cost starting materials to manufacture inexpensive catalyst materials having three-way activity for use in conversion of exhausts from internal combustion engines, fuel cells, metal air batteries, treatment of exhaust from internal combustion engines and treatment of industrial waste gases with improved activity and thermal and chemical stability. A need also exists to manufacture bulk materials, thin films and single-crystals of materials showing GMR using inexpensive starting materials.

SUMMARY OF THE INVENTION

It is an object of the present invention to provide improved catalyst materials with three-way activity, manufactured from inexpensive starting components. It is also an object of the present invention to provide a perovskite-type metal oxide compound having giant magnetoresistance effect. It is further an object of the present invention to provide a method of making improved catalyst materials and the perovskite-type metal oxide compounds of the present invention.

Accordingly, one object of the present invention is to provide a perovskite-type catalyst consisting essentially of a metal oxide composition. The metal oxide composition is represented by the general formula $A_{a-x}B_xMO_b$, in which A is a mixture of elements originally in the form of single phase mixed lanthanides collected from Bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$.

In a preferred embodiment, the single phase perovskite-type materials of the present invention have a formula $A_{1-x}B_xMO_3$, and preferably x is about 0.2 to 0.5.

In another preferred embodiment, the single phase materials of the present invention are perovskite-type materials having a formula $A_{2-x}B_xMO_4$.

Another object of the present invention is to provide a perovskite-type metal oxide compound represented by the general formula $A_{a-x}B_xMO_b$, in which A is a mixture of elements originally in the form of single phase mixed lanthanides collected from Bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$. The perovskite-type metal oxide compound of the invention contains Mn on its B-site.

A further object of the present invention is to provide a method of preparing a perovskite-type catalyst consisting essentially of a metal oxide composition having component elements represented by the general formula $A_{a-x}B_xMO_b$, in which A is a mixture of elements originally in the form of single phase mixed lanthanides collected from Bastnasite, B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$. The method comprises forming a homogeneous mixture of a single phase mixed lanthanide salt collected from bastnasite and respective salts, or oxides of elements B, and M; and forming a perovskite-type metal oxide composition from said homogeneous mixture.

The invention is further defined in the appended claims and in the following description of preferred embodiments.

BRIEF DESCRIPTION OF THE DRAWINGS

The above-mentioned and other features of this invention and the manner of obtaining them will become more apparent, and will be best understood by reference to the following description, taken in conjunction with the accompanying drawings. These drawings depict a typical embodiment of the invention and do not therefore limit its scope. They serve to add specificity and detail in which.

DETAILED DESCRIPTION OF THE INVENTION

Figure 1:
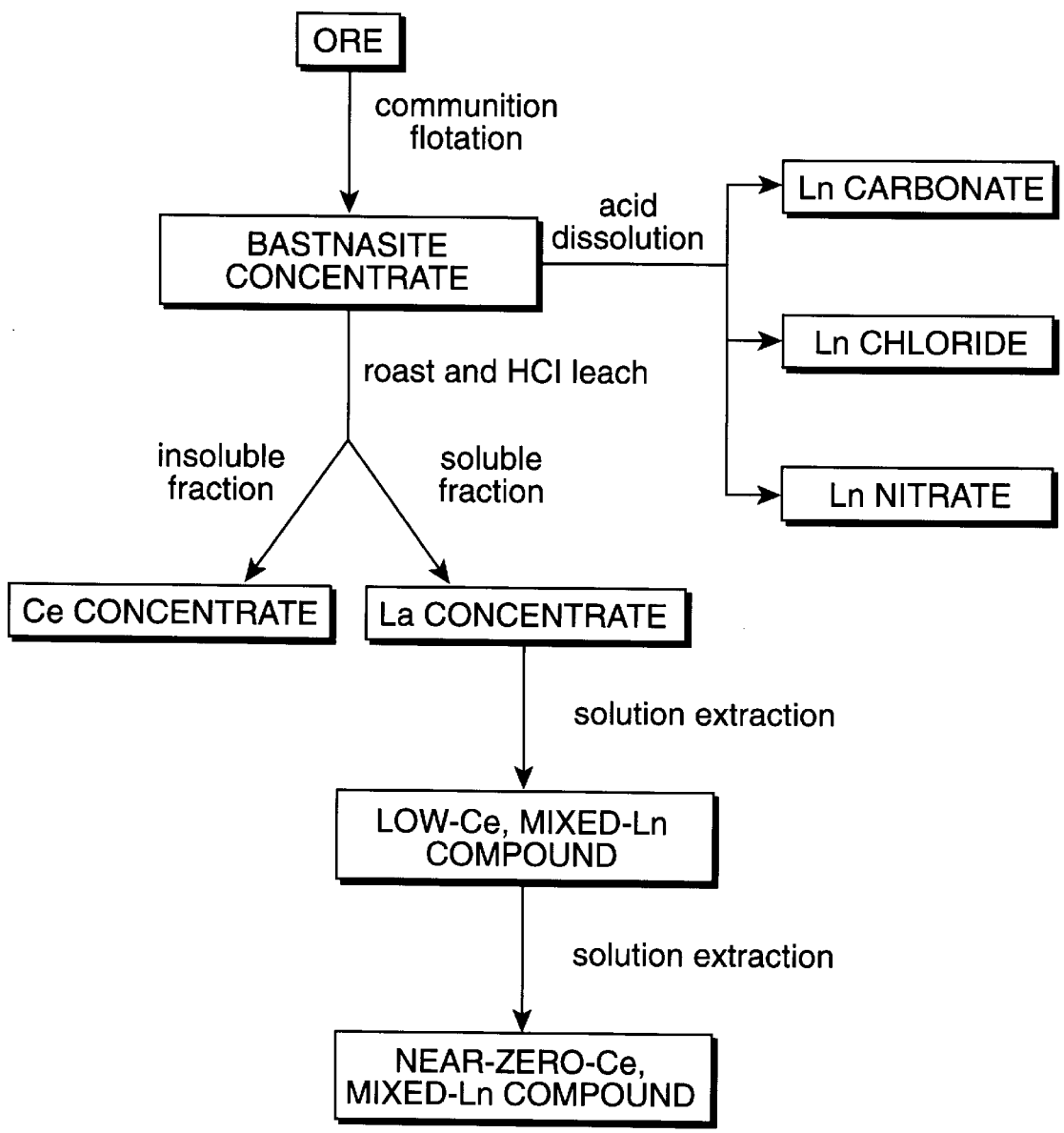
FIG. 1 shows a processing route of Bastnasite, and its mixed lanthanide derivatives.

The present invention is based on the discovery that single phase mixed lanthanides collected from Bastnasite can be used in making perovskite-type materials. According to the present invention, single phase mixed lanthanides from Bastnasite can be used to make perovskite-type catalysts with improved activities. The catalysts of the present invention have three-way activity and can be used for the removal of unsaturated and saturated hydrocarbons, nitrogen oxides and carbon monoxide from the exhaust gases of internal combustion engines and from industrial waste gases. They also exhibit high thermal and chemical stability.

As discussed above, the source of the lanthanide component in prior art is an oxide, carbonate, nitrate or acetate of one lanthanide element, with a high degree of purity with respect to other lanthanides; or a mixture of highly purified lanthanide elements. The perovskite materials of this invention overcome the disadvantage of being made using relatively expensive, research-grade sources for the lanthanide elements. The advantage of the use of a mixed lanthanide source relates to the need for an inexpensive fabrication route. The cost of producing perovskites using a single phase mixed lanthanides of the present invention is three to four times less than the cost using a single rare earth element.

Accordingly, the present invention provides a single phase perovskite-type catalyst consisting essentially of a metal oxide composition represented by the general formula, $A_{a-x}B_xMO_b$, in which A is a mixture of elements originally in the form of single phase mixed lanthanides collected from Bastnasite; B is a divalent or monovalent cation; M is at least one element selected from the group consisting of elements of an atomic number of from 22 to 30, 40 to 51, and 73 to 80; a is 1 or 2; b is 3 when a is 1 or b is 4 when a is 2; and x is a number defined by $0 \leq x < 0.7$. In a preferred embodiment, the single phase perovskite materials of the present invention have a formula $A_{1-x}B_xMO_3$, and preferably x is about 0.2 to 0.5. In another preferred embodiment, the single phase materials of the present invention are perovskite-type materials having a formula $A_{2-x}B_xMO_4$. In further preferred embodiment, the single phase perovskite materials of the present invention have the general formula, $A_{a-x}B_xMO_b$, in which A is a mixture of elements selected from the group consisting of lanthanides of an atomic number of from 57 to 71, or alternatively, A is a mixture of elements selected from the group consisting of yttrium and lanthanides of an atomic number of from 57 to 71.

A single phase mixed lanthanide is a single compound wherein the cation positions in the compound's crystal structure can be occupied by a variety of lanthanides. Alternatively, the cation positions of the single phase mixed lanthanide may be occupied by a variety of lanthanides. The single phase mixed lanthanide of the present invention are generated from bastnasite ore. They may contain a number of lanthanide cations and nitrate, carbonate, or chloride anions. These monophasic materials may be hydrated materials, namely they may contain waters of hydration. Thus hydroxyl ions may take up anion positions in the lattice of the monophasic material.

It is known in the art that bastnasite is an ore of a mixed lanthanide fluoride carbonate. The mixed lanthanide fluoride carbonates of bastnasite adopt a crystal structure with discrete layers of [LnF] and [CO$_3$] (Y, Ni et al, Am. Mineral. 78 (1993) 415), wherein F can be replaced by OH (M. Fleischer, Can. Mineral, 16 (1978) 361).

Different lanthanide (Ln) derivatives can be prepared from bastnasite through methods commonly known in the art. Examples of such methods are described in *Cer. Eng. Sc. Proc.* By B. T. Kilbourn, 6 (1985) pp. 1331–1341, and in *The Discovery and Industrialization of the Rare Earths,* by Fathi Habashi, UNOCAL [76]MOLYCORP, (1994) FIG. 14, the text of which is incorporated herein by reference. A typical flow chart relating Ln derivatives obtained from bastnasite ores is shown in FIG. 1. According to FIG. 1, Bastnasite ore is first treated by comminution and floatation to generate Bastnasite concentrate. Through acid dissolution techniques, Ln carbonate, Ln chloride, or Ln nitrate is generated from the Bastnasite concentrate. Through roast and acid leaching techniques, soluble and insoluble fractions are generated from the Bastnasite concentrate. La concentrate is from the soluble fraction, and Ce concentrate is from the insoluble fraction. Further solution extraction from the Ln concentrate produces low-Ce (i.e. 4% CeO$_2$ when analyzed on a Ln oxide basis) and mixed Ln compounds.

Ln derivatives can be classified in terms of steps needed to produce them. Both the Bastnasite concentrate and the Ln derivatives generated by acid dissolution contain a natural ratio of Ln's. A natural ratio of Ln's is a ratio identical or close to their natural distribution proportions in bastnasite ores. A typical analysis on a Ln oxide basis is: 4.0% Pr oxide, 50.5% Ce oxide, 33.7% La oxide, and 11.8% Nd oxide. It is understood that this ratio may vary owing to inherent variability, not only in the ore body but also in the mineral itself. Both the La and Ce concentrates contain a modified ratio of Ln's. A modified ratio of Ln's is a ratio different from the natural ratio of Ln's, and a ratio existing in any by-products of the processing route of Bastnasite as shown in FIG. 1.

The single phase mixed lanthanides used in the present invention may be generated from any of the above-mentioned concentrates. They may have a natural ratio of Ln's or a modified ratio of Ln's. In general, any single phase mixed lanthanides generated from any of the above-mentioned concentrates may be used as a lanthanide source for making a perovskite-type material of the present invention.

For example, Ln derivatives generated from bastnasite concentrate by acid dissolutions, such as but not limited to Ln chloride, Ln carbonate, and Ln nitrate, are single phase, pure compounds with a mixture of Ln cations, and can be used as a Ln source for the purpose of the present invention. Such Ln derivatives have a natural ratio of Ln's, and are cerium-rich. Likewise, single phase mixed lanthanides, such as but not limited to hydrated mixed lanthanide carbonate or hydrated mixed lanthanide nitrate, may be crystallized as single phase compounds with a mixture of Ln cations coming out of a solution of La concentrate. Such single phase mixed lanthanides have a modified ratio of Ln's. For example, they may contain about 4% of $CeO_2$, when analyzed on a Ln oxide basis.

The perovskite-type materials of this invention are doped on the A-site with sufficient and appropriate monovalent or divalent cations to form electrically conductive, monophasic perovskites with high catalytic activity. The examples of monovalent or divalent cations include, but are not limited to, Na, K, Li, Ca, Sr, Ba, Pb and the like.

The amount of monovalent or divalent cations are sufficient and appropriate if they are in such an amount that the bulk composition's atomic ratio of element M in the B site and the A and B elements in the A site is about 1:1.

Similarly, sufficient and appropriate M element is used for the B site of the perovskite or perovskite type materials of this invention. M is one or many of elements with atomic numbers lying in the range 22 to 30, 40 to 51, and 73 to 80. Examples of M element include, but are not limited to, Fe, Mn, and the like. The amount of M elements is sufficient and appropriate if they are in such an amount that the bulk composition's atomic ratio of element M in the B site and the A and B elements in the A site being in 1:1. In a preferred embodiment, the Mn element is in B-site.

The present invention also provides a method of making the perovskite-type materials of the invention. The method comprises the steps of making a homogeneous mixture of a single phase mixed lanthanide salts collected from bastnasite and respective salts, or oxides of elements B, and M; and forming the perovskite-type metal oxide composition from the homogeneous mixture.

The homogenous mixture of salts may be in a form of a solution or a form of a solid. The homogenous mixture may be formed by dissolving a single phase lanthanide salt, together with salts containing elements B and M respectively in a solution such as water and also can be formed by dissolving in acid, e.g., vitric acid. The mixture may also be formed by grinding a single phase lanthanide salt with salts or oxides of element B and M. Other methods known in the art for forming the homogenous mixture may also be used. The salts used in the method of the invention may be nitrates, carbonates, hydroxides, acetates, oxalates, or chlorides of component elements A, B, and M. Oxides of B and M may also be used to make the homogenous mixture. The amount of each salt used is a function of the desired composition in the final perovskite compound.

A perovskite-type metal oxide material may be formed from the mixture by techniques such as but not limited to pelletizing, spray-drying, sintering, or calcination. Those techniques may be used alone or in combination to obtain perovskite-type metal oxide materials.

In a preferred embodiment, a malic acid solution technique is used when the homogenous mixture is in a form of a solution. For example, the following salts may be dissolved in a solution such as water to form a homogenous mixture: a single phase lanthanide salt, such as but not limited to single phase mixed hydrated lanthanide carbonate, single phase mixed hydrated lanthanide nitrate or the like; a salt of elements B, such as but not limited to calcium nitrate tetrahydrate, strontium nitrate or the like; and one or more salts of element M, such as but not limited to cobalt nitrate hexahydrate, hydrated manganese nitrate, hydrated chromium nitrate, hydrated iron nitrate, nickel nitrate or the like. Then malic acid may be added and dissolves into the solution. A foam-like precipitate is formed through heating the solution to a temperature between 200 and 250° C. in air. The foam can be heated or calcined to a temperature of 400° C. or higher to form the perovskite-type material. Periodic grinding during the calcining process is preferred. Alternatively, when an additional and different element M is desired, the salt or oxide form of such an element may be added to the precipitate, and powdered or sintered together with the precipitate to form a powder of single phase perovskite-type metal oxide materials having multiple M elements.

In another preferred embodiment, a sintering or calcining technique is used when the homogenous mixture is in a form of a solid. For example, a single phase mixed lanthanide salt may be mixed with oxides of elements B and M by grinding and homogenizing to form a homogenous mixture. Then the mixture can be powdered or sintered at temperatures from 700 to 1000° C. to form a powder of single phase perovskite-type metal oxide materials.

The powders of perovskite-type materials can be further formed into pellets. Techniques such as uniaxial cold press and the like may be used to form the pellets.

The metal oxide materials made by the method of the invention have perovskite structure and they are single phase materials. X-ray diffraction analysis is used to show the perovskite structure of materials, and the presence, if any, of second phases or impurity phases. The Brunauer, Emmett and Teller (B.E.T.) surface area is measured by a gas absorption apparatus for proving how fine-grained the powder is. The surface area is measured and is normalized to the weight of solid i.e., $m^2/g$. A high $m^2/g$ (specific surface area) corresponds to a small fundamental grain or particle size. Catalytic functions occur on surfaces, therefore, it is important that a catalyst can be made with a large specific surface area.

The single phase perovskite-type metal oxide materials of this invention can be used as a catalyst. The perovskite-type catalyst of the present invention may be used as it is, or may take the form of pellets or particles which may be of uniform composition or may take a supported form with active ingredient being dispersed through or present as a coating on the individual bodies.

For example, the perovskite-type material of this invention can be extruded or molded into monolithic bodies including honeycombs that consisting of channels running the length of the body, and thin interconnected walls. The method of making such extrusions are well know in the art. Briefly, in making the extrusions, organic compounds and liquids are added to the perovskite-type powders such that a plastic mass of appropriate rheological properties is formed. This body is extruded through an appropriately designed die to from a green body and is then heat treated or calcined at temperatures to impart a sufficient mechanical strength and durability and to completely remove all organic additions.

The perovskite-type powder of this invention also may be formed into an open cell foam according to methods known in the art. Briefly, the ceramic powder which is to be formed into a foam is mixed with carbon powder. The mixture is heated to high temperatures in a sufficiently oxygen-containing atmosphere such that the carbon support is removed leaving a solid ceramic foam with open, interconnected cells.

In addition, the perovskite-type powder of this invention may be deposited or applied to the surface of a ceramic honeycomb, or some other monolith. The ceramic honeycomb may be a type of alumina, mullite, cordierite or some other alumino-silicate support. The application can occur via a washcoat, as known in the art.

Furthermore, the perovskite-type powder of this invention may be dispersed on the ceramic support by impregnating the support by the same solution used to make the powder in accordance with the invention. The impregnated support is heated to a high enough temperature to allow the perovskite-type phase to form on the surface of the support in a highly dispersed state.

The perovskite-type catalyst of the present invention has an improved threeway catalytic activities for the removal of unsaturated and saturated hydrocarbons, nitrogen oxides and carbon monoxide from the exhaust gases of internal combustion engines, including small gasoline engines, and from industrial waste gases. They also exhibit high thermal and chemical stablity. Further they possess resistance to sulfur dioxide poisoning. Accordingly, they may be used for removal of hydrocarbons, nitrogen oxides and carbon monoxide from the exhaust gases of internal combustion engines and from industrial waste gases. They may also be used as a physical filter for soot particles with chemical removal of same by the material's catalytic activity.

It is known in the art that perovskite materials (powders, single crystals and thin films) containing Mn on the B-site show the giant magnetoresistance effect. Because of this, the perovskite materials of the present invention having Mn on the B-site may also be used to make devices such as magnetic recording heads or the like.

The following examples are intended to illustrate, but not to limit, the scope of the invention. While the method described provides the necessary information to make any given perovskite materials of the present invention typically those that might be used, other procedures known to those skilled in the art may alternatively be used.

METHODS OF MAKING PEROVSKITE OR PEROVSKITE TYPE MATERIALS OF THE PRESENT INVENTION

EXAMPLE 1

A single phase perovskite material of nominal chemical composition $Ln_{0.6}Ca_{0.4}CoO_3$ was synthesized by dissolving 104.15 g of mixed hydrated lanthanide carbonate, $Ln_2(CO_3)_3 \cdot 4H_2O$, in a solution formed by dissolving 57.5 g of calcium nitrate tetrahydrate, $Ca(NO_3)_2 \cdot 4H_2O$ and 177.15 g of cobalt nitrate hexahydrate, $Co(NO_3)_3 \cdot 6H_2O$ into 2 liters of water. Intense stirring was used to form a solution of all the components. The mixed lanthanide carbonate hydrate contains La, Ce, Pr and Nd. To this solution was added 200 g of malic acid. The solution was placed in a rotary evaporator and heated by a water bath. The water bath was heated to 90° C. The solution was reduced to 20% of its original volume, and had the consistency of a thick syrup. The syrup was placed into a flat refractory tray and heat treated at 200° C. for 1 hr. The syrup was converted into a solid foam. The foam was then heat treated at a temperature of 700° C. in air for 2 hrs with an intermediate grind after 1 hr. The product comprised of a black powder of the noted chemical composition. X-ray diffraction analysis showed the material to be a single phase perovskite with a B.E.T. specific surface area of 13 $m^2/g$.

The mixed hydrated lanthanide carbonate used herein is a single phase compound crystallized from the La concentrate. Therefore, it contained a modified ratio of Ln's. The Cerium concentration is about 4% on a lanthanide oxide basis.

Figure 2:
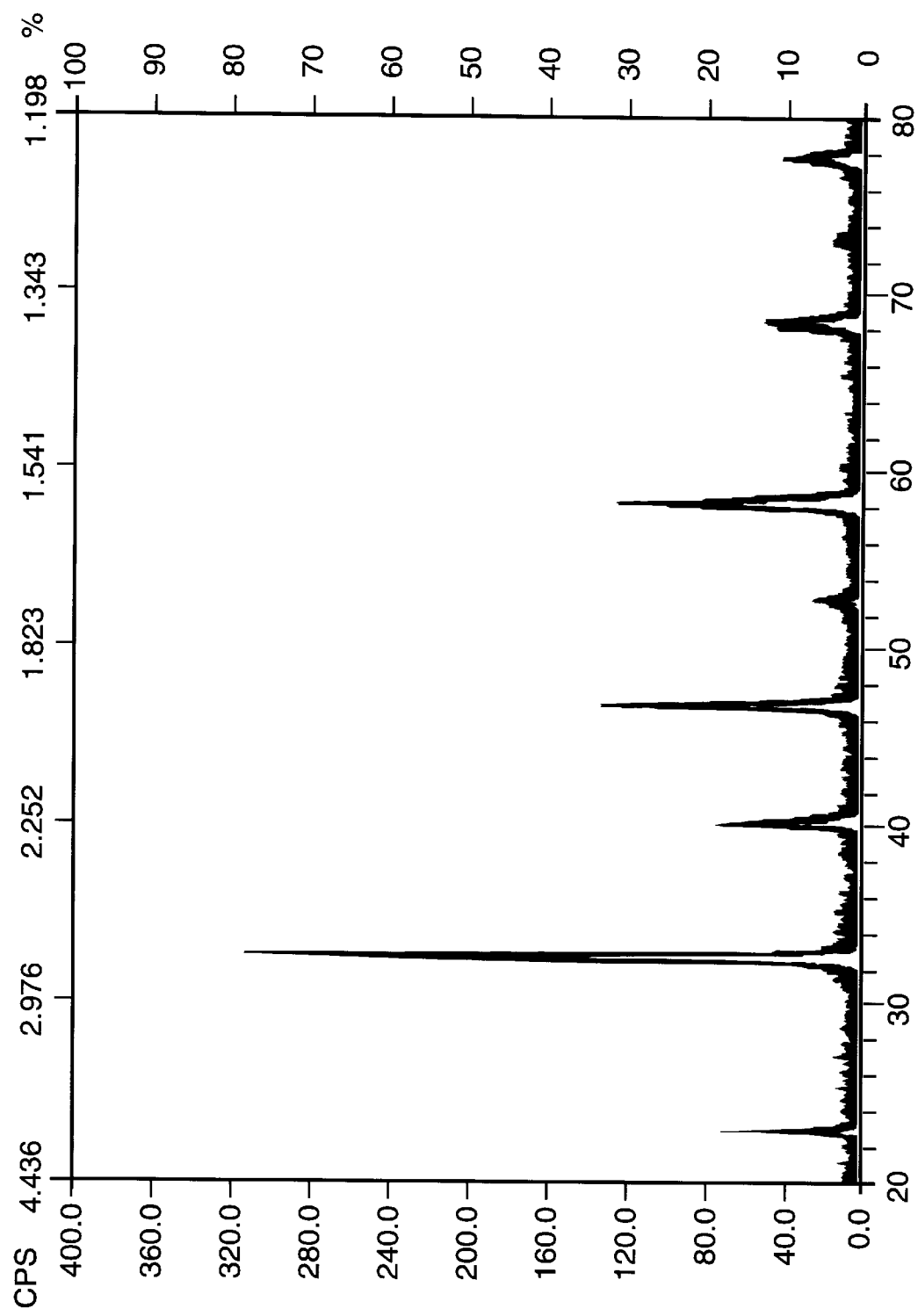
FIG. 2 shows the X-ray diffraction trace of a perovskite material of the present invention.

FIG. 2 shows the measured X-ray diffraction intensity as a function of two-theta when a perovskite material of composition $Ln_{0.6}Ca_{0.4}CoO_3$, made according to Example 1, is impinged by a source of monochromatic X-ray radiation. FIG. 2 shows that the compound of Example 1 is a single phase perovskite material. All the peaks in the trace can be indexed according to the crystal structure of the perovskite phase.

EXAMPLE 2

A single phase perovskite material of the same chemical composition as in Example 1 was synthesized by dissolving 104.15 g of mixed hydrated lanthanide carbonate, $Ln_2(CO_3)_3 \cdot 4H_2O$, in a solution formed by dissolving 57.5 g of calcium nitrate tetrahydrate, $Ca(NO_3)_2 \cdot 4H_2O$ and 177.15 g of cobalt nitrate hexahydrate, $Co(NO_3)_3 \cdot 6H_2O$ into 2 liter of water. Intense stirring was used to form a solution of all the components. To this solution was added 200 g of malic acid. The solution was reduced to half its volume by heating at 80° C. on a hot plate for three hours. The solution was then placed on a refractory tray and heated at 200° C. for 1 hr. The solid foam so obtained was heat treated at 700° C. in air for 2 hrs with an intermediate grind after 1 hr. The product comprised of a black powder of the noted chemical composition and X-ray diffraction analysis showed the material to be a single phase perovskite with a B.E.T. specific surface area of 13 $m^2/g$.

EXAMPLE 3

A single phase perovskite material of the same composition as in Examples 1 and 2 was synthesized by grinding and homogenizing 52.08 g of mixed hydrated lanthanide carbonate, 6.83 g of calcium oxide, CaO and 22.82 g of cobalt oxide, CoO. The mixture was heated at 800° C. for 36 hrs in air with periodic regrinding. The product, comprising of a black powder, was characterized by X-ray diffraction as being a single phase perovskite compound with a B.E.T. surface area of 1.2 $m^2/g$.

EXAMPLE 4

A single phase perovskite powder—as produced according to Example 1—was consolidated into pellets by using a uniaxial cold press. The pellets so produced were heat treated at a range of heat treatment temperatures for a period of 1 hr. The pellets so heat treated were analyzed by X-ray diffraction and the B.E.T. specific surface area was measured. In each case X-ray diffraction showed that the material remained a single-phase perovskite material regardless of heat treatment temperature.

EXAMPLE 5

A single phase perovskite powder of composition $Ln_{0.83}Sr_{0.17}MnO_3$ was synthesized according to the method illustrated in Example 2. The powder was made by dissolving 105.3 g of mixed hydrated lanthanide carbonate, $Ln_2(CO_3)_3.4H_2O$, 10.1 g of strontium nitrate $Sr(NO_3)_2$ and 50 g of hydrated manganese nitrate, $Mn(NO_3)_2.6H_2O$ into 2 liters of water. Malic acid was added to the solution and heat treatments were carried out as in Example 2. The product comprised of a black powder of the noted chemical composition and X-ray diffraction analysis showed the material to be a single phase perovskite with a B.E.T surface area of 9.3 $m^2/g$.

EXAMPLE 6

A single-phase perovskite powder of composition $Ln_{0.7}Sr_{0.3}CrO_3$ was synthesized according to the method illustrated in Example 2. A solution was made by dissolving 23.48 g of mixed hydrated lanthanide carbonate, $Ln_2(CO_3)_3.4H_2O$, 7.52 g of strontium nitrate, $Sr(NO_3)_2$, and 45 g of hydrated chromium nitrate, $Cr(NO_3)_3.9H_2O$ into 1 liter of water. 60 g of malic acid is added to the solution. Heat treatments were carried out as in Example 2. A heat treatment temperature of 900° C. was required to obtain a phase-pure, perovskite material. The product was an olive green powder with a B.E.T. surface area of 11.3 $m^2/g$.

EXAMPLE 7

A single-phase perovskite powder of composition $Ln_{0.6}Ca_{0.4}Fe_{0.8}Mn_{0.2}O_3$ was synthesized according to the method illustrated in Example 2. A solution was formed by dissolving 47.68 g of mixed hydrated lanthanide carbonate, $Ln_2(CO_3)_3.4H_2O$, 26.50 g hydrated calcium nitrate $Ca(NO_3)_2.4H_2O$, 90.7 g of hydrated iron nitrate, $Fe(NO_3)_3.9H_2O$ and 17.93 g of hydrated manganese nitrate, $Mn(NO_3)_2.6H_2O$ into 2 liters of water. To this solution was added 130 g of malic acid. Heat treatments were carried out as in Example 2. The product was a black, single-phase perovskite powder of the noted chemical composition, having a B.E.T. surface area of 32.1 $m^2/g$.

EXAMPLE 8

A single phase perovskite material of composition $Lno_{0.8}Sr_{0.2}Mn_{0.9}Ni_{0.04}Ru_{0.06}O_3$ was synthesized. A solution was formed using 45.78 g of mixed hydrated lanthanide carbonate, $Ln_2(CO_3)_3.4H_2O$, 52.18 g of manganese nitrate hexahydrate, $Mn(NO_3)_2.6H_2O$, 8.56 g of strontium nitrate, $Sr(NO_3)_2$ and 2.35 g of nickel nitrate hexahydrate, $Ni(NO_3).6H_2O$ in 1 liter of water. To the solution was added 60 g of malic acid. This solution was reduced to half the original volume by heating on a hot plate for three hours. The solution was converted into a solid foam as in Example 2. The solid foam so obtained was heated at 350° C. for 2 hrs and ground with 1.61 g of ruthenium oxide, $RuO_2$. This mixture was then heat treated at 800° C. for 10 hrs to produce a single-phase perovskite powder of the desired composition with a B.E.T. surface area of 9.8 $m^2/g$.

EXAMPLE 9

A single-phase perovskite powder of composition $Ln_{0.8}K_{0.2}Mn_{0.95}Ru_{0.05}O_3$ was synthesized according to the method illustrated in Example 8. A solution was formed by dissolving 52.17 g of mixed hydrated lanthanide carbonate, $Ln_2(CO_3)_3.4H_2O$ 4.66 g of potassium nitrate, $KNO_3$, and 62.77 g of hydrated manganese nitrate, $Mn(NO_3)_2.6H_2O$ in 2 liters of water. 110 g of malic acid was dissolved in this solution. As illustrated in Example 8, the $RuO_2$ was added to the foamed solution after a heat treatment at 350° C. In this example 1.53 g of $RuO_2$ was added to the ground, heat treated foam. This mixture was heat treated at 700° C. for 15 hrs to produce a black, single-phase perovskite powder of the noted composition and with a specific, B.E.T. surface area of 10.5 $m^2/g$.

EXAMPLE 10

A single-phase perovskite powder of composition $Ln_{0.7}Sr_{0.3}Cr_{0.95}Ru_{0.05}O_3$ was synthesized according to the method illustrated in Example 8. A solution was formed by dissolving 39.27 g of mixed hydrated lanthanide carbonate, $Ln_2(CO_3)_3.4H_2O$, 12.57 g of strontium nitrate, $Sr(NO_3)_2$, and 75.27 g of hydrated 1 chromium nitrate, $Cr(NO_3)_3.9H_2O$ in 1.5 liters of water. To this solution 82 g of malic acid was added. 1.32 g of $RuO_2$ was added to a powder, comprising of the foamed solution that had been heat treated at 350° C. This mixture was then heat treated at 1000° C. for 32 hrs to produce a dark brown single-phase perovskite powder of the noted composition. The B.E.T. surface area of the powder was 12.9 $m^2/g$.

EXAMPLE 11

A single-phase perovskite of composition $LnNiO_3$ was synthesized according to the method illustrated in Example 2. A solution is formed by dissolving 38.97 g of mixed hydrated lanthanide concentrate, $Ln_2(CO_3)_3.4H_2O$ and 40 g of hydrated nickel nitrate, $Ni(NO_3)_2.6H_2O$ to 0.5 liters of water. Into this solution was dissolved 50 g of malic acid. Heat treatments were carried out as in Example 2. The black powder so obtained was a single-phase perovskite of the noted composition, with a specific surface area of 23.2 $m^2/g$.

EXAMPLE 12

A single-phase powder with the perovskite-type "$K_2NiF_4$" structure of composition $Ln_2(Cu_{0.6}Co_{0.2}Ni_{0.2})O_4$ was synthesized according to the method illustrated in Example 2. A solution is formed by dissolving 50.0 g of mixed hydrated lanthanide concentrate, $Ln_2(CO_3)_3.4H_2O$, 12.32 g of hydrated copper nitrate, $Cu(NO_3)_2.6H_2O$, 5.13 g of hydrated nickel nitrate, $Ni(NO_3)_2.6H_2O$ and 5.14 g of hydrated cobalt nitrate, $Co(NO_3)_3.6H_2O$ in 2 liters of water. Into this solution is dissolved 150 g of malic acid. Heat treatments were carried out as in Example 2. The black powder so obtained was a single-phase powder with the "$K_2NiF_4$" structure of the noted composition and with a specific surface area of 14.3 $m^2/g$.

EXAMPLE 13

A single phase perovskite material of composition $Ln_{0.8}K_{0.2}Mn_{0.95}Ru_{0.05}O_3$ was synthesized according to the method illustrated in Example 9. A solution was formed by dissolving 50.3 g of a mixed hydrated lanthanide nitrate, $Ln(NO_3)_3.4H_2O$, 39.56 g of hydrated manganese nitrate, $Mn(NO_3)_2.6H_2O$ and 2.94 g of potassium nitrate, $KNO_3$ in 1.5 liters of water. 51 g of citric acid was dissolved in this solution. As illustrated in Example 9, the $RuO_2$ was added to the foamed solution after a heat treatment at 350° C. In this example, 0.96 g of $RuO_2$ was added to the ground, heat treated foam. This mixture was heat treated at 700° C. for 15 hrs to produce a black, single-phase perovskite powder of the noted composition with a B.E.T. surface area of 12.2 $m^2/g$.

The hydrated lanthanide nitrate is a single phase product of crystallization coming out of the solution of La concentrate. The product has a modified ratio of Ln's. The cerium concentration on a oxide base is about 5% of the total Ln's.

EXAMPLE 14

A single phase perovskite material of composition $Ln_{0.6}Ca_{0.4}Fe_{0.8}Mn_{0.2}O_3$ was synthesized according to the method illustrated in Example 2. A solution is formed by dissolving 71.64 g of a Ln carbonate, $Ln_2(CO_3)_3 \cdot 4H_2O$, 39.75 g hydrated calcium nitrate $Ca(NO_3)_2 \cdot 4H_2O$, 136.05 g of hydrated iron nitrate, $Fe(NO_3)_3 \cdot 9H_2O$ and 26.90 g of hydrated manganese nitrate, $Mn(NO_3)_2 \cdot 6H_2O$ into 3 liters of water. To this solution was added 130 g of malic acid. Heat treatments were carried out as in Example 2. The product was a black, single-phase perovskite powder of the noted chemical composition, having a B.E.T. surface area of 34.3 $m^2/g$. The mixed hydrated Ln carbonate used in this example is a single phase compound from bastnasite concentration by acid dissolution process. It has a natural ratio of Ln's. Therefore, the cerium concentration reflects the natural ratio of cerium in any given bastnasite, i,e. It is slightly higher than the La content on a LnO basis.

THREE-WAY CATALYTIC ACTIVITIES OF PEROVSKITE MATERIALS OF THE PRESENT INVENTION

EXAMPLE 15

Figure 3:
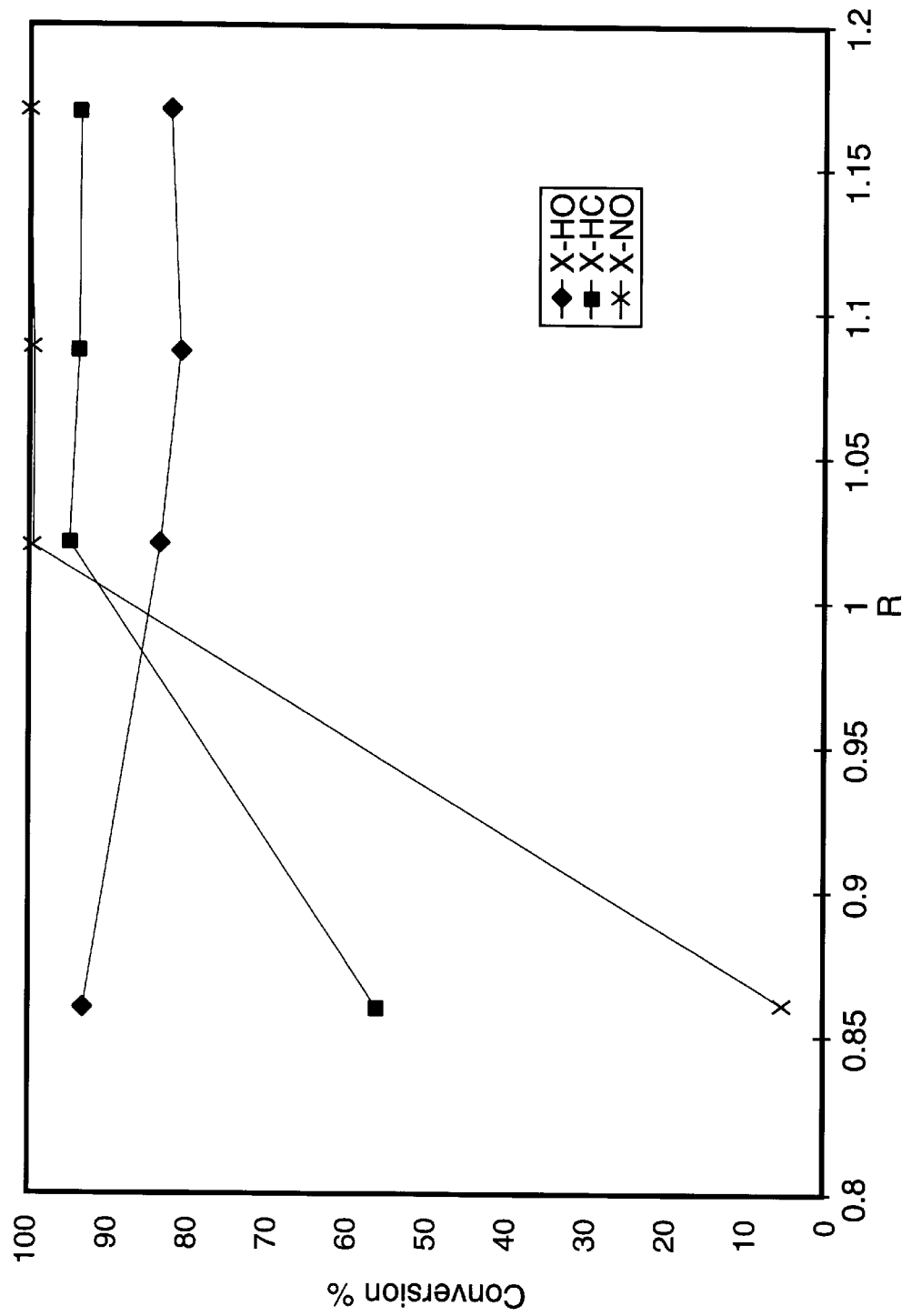
FIG. 3 shows three-way catalytic activities of a perovskite material of the present invention

Perovskite-type materials made according to the present invention are measured for its three-way catalytic activities. FIG. 3 shows the conversion percentages, catalyzed by a perovskite material of composition $Ln_{0.8}K_{0.2}Mn_{0.95}Ru_{0.05}O_3$ as described in Example 9, for the conversion of NO, HC and CO from a gas mixture simulating automobile exhausts with varying oxygen content. The space velocity of the gas was 33,000 $h^{-1}$ and the temperature of the perovskite catalyst bed was held at a temperature of 550° C. The redox potential of the gas, R, is approximated by $\{3C_{HC}+C_{CO}\}/\{C_{NO}+2C_{O2}\}$, wherein C represents the concentration of the gases. In general, when R>1, the gas is classified as a reducing gas which are generated by a fuel-rich exhaust. When R<1, the gas is classified as an oxidizing gas which are generated by fuel-lean exhaust. In addition to these four gases, namely CO, $C_3H_6$, NO and $O_2$ carbon dioxide and steam were also present in the gas mixture.

For a gas mixture which is typical of engine exhaust from the middle of the range of air-fuel ratios (R=1.02) the material shows good three-way conversion.

Conversions of CO, NO and HC were 83.1, 94.4 and 99.6 respectively. With fuel-rich gases (R=1.086, R=1.17) the material also displays excellent three-way conversion. This is unusual and is a unique feature of the mixed-valence oxide materials, and is also related to the Ce on the A-site for fuel-rich gases. The conversion of CO dropped fractionally below 80%, the conversion of the HC was above 90% and the conversion of NO approached 100% (the output NO level was measured less than 10 ppb). For gases simulating lean fuel-air mixtures (R=0.86) the NO conversion was below 10%. The CO conversion was above 90% and the HC conversion was above 50%. The low conversion of NO in oxidizing gases is well-known and is a direct consequence of the fundamental nature of the NO reduction process and the redox potential of this gas.

The whole data set was highly reproducible—the gas mixture could be cycled between "rich" (R=1.17) and "lean" (R=0.86) with repeatable conversions for all three critical gases. In addition, the conversion performance for a particular gas (a given R) was not a function of the history of the sample testing—e.g. which type of gas was run first etc. This is significant since a lot of the previous work on these types of materials were plagued by hysterisis effects. Such effects would preclude any realistic application of these materials in technological applications.

In conclusion, FIG. 3 shows that the material made according to this invention is active as a "three-way catalyst'" with particularly effective performance at the rich end of the operating window (commonly used in closed-loop three-way catalytic converters). This superior rich performance is attributed to the presence of a mixed lanthanide A-site in the perovskite, in particular it can be attributed to the presence of Ce on the A-site of the perovskite phase. It is understood that the materials made according to the present invention contains at least about 4% of $CeO_2$ on a LnO basis.

EXAMPLE 16

The temperature at which catalytic converter materials become active is very important technologically and is commonly referred to as the "light-off" temperature. The catalytic activity of the material is monitored as the catalyst bed is progressively heated up from ambient temperatures.

Figure 4:
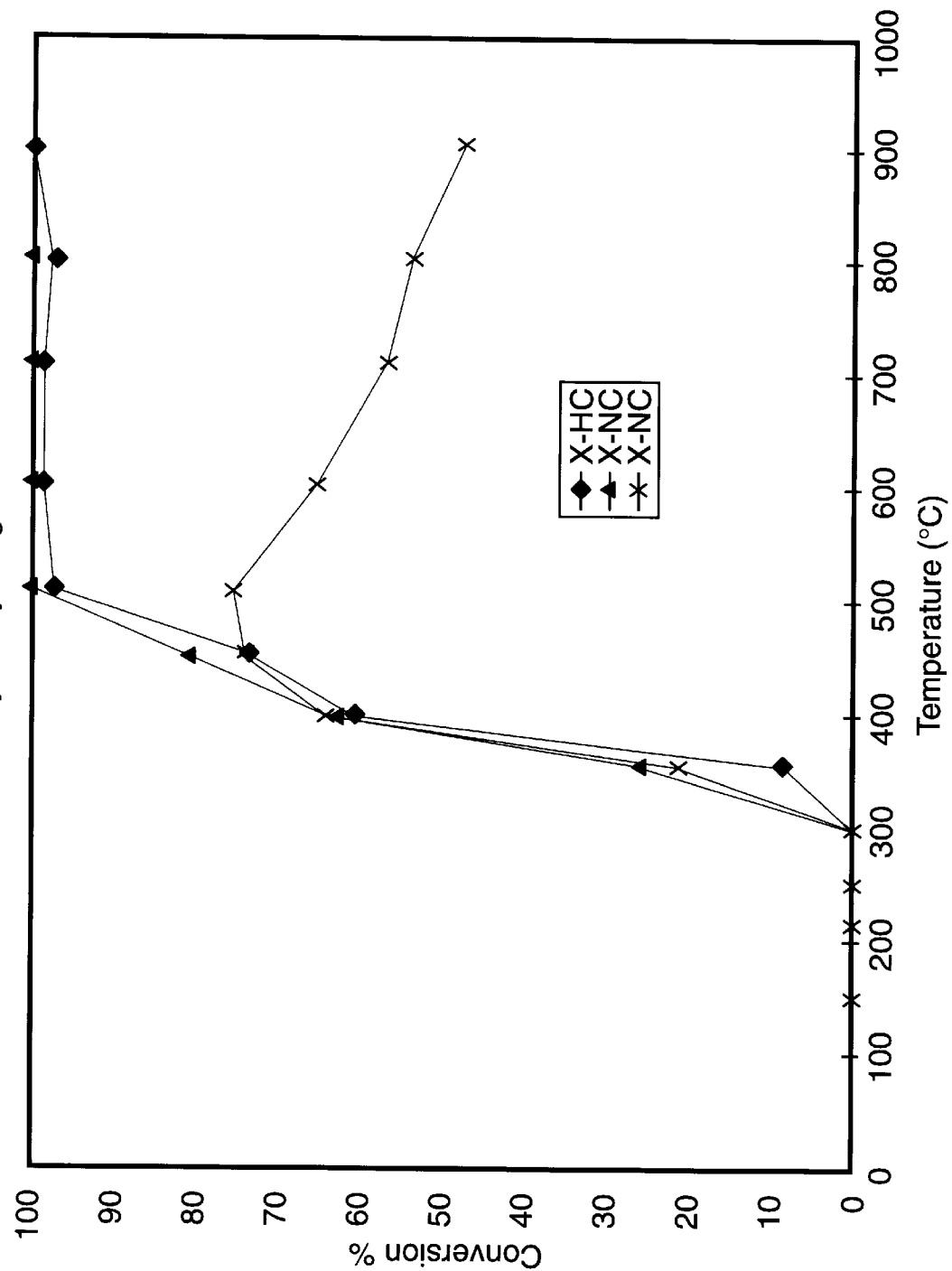
FIG. 4 shows three-way catalyst "light off" test.

FIG. 4 shows the light-off behavior of the material for a reducing gas mixture (R=1.17) with a space velocity of 61,300 $h^{-1}$. At temperatures below 300° C. the material showed no conversion activity. In the temperature window of 300° C. to 400° C., there was a rapid increase of conversion activity with temperature. At 500° C. and above, conversion activities for NO and HC were high (greater than 99.9% and 97.0%, respectively). This high activity was maintained up to the maximum testing temperature of 900° C. The CO conversion activities were slightly lower than the levels measured in the previous test (FIG. 3: conversion of CO at T=550° C. and R=1.17 was measured at 82.1%, whereas the corresponding conversion in this test, FIG. 4, is approximately 75%). There is a significant decrease in CO conversion activity as temperatures are increased above 500° C. One possible cause of this decrease in CO conversion activity is the relatively high space velocity used in these measurements compared to that used in the earlier measurements (61,300 $h^{-1}$ vs. 33,000 $h^{-1}$).

In conclusion, FIG. 4 shows that (1) the catalytic activity of the material is good at high temperatures (900° C.), and (2) there is appreciable activity significantly below the usual operating temperature range for a traditional catalytic converter (500° C.–700° C.). In other words, the material shows a considerable cold-start function.

The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes which come within the meaning and range of the equivalence of the claims are to be embraced within their scope.

What is claimed is:

1. A perovskite-type catalyst consisting essentially of a metal oxide composition represented by the general formula:

wherein
- A is a mixture of elements originally in the form of a single phase mixed lanthanide collected from bastnasite
- B is a divalent or monovalent cation;

M is at least one element selected from the group consisting of elements of an atomic number of from 22 to 30, 40 to 51, and 73 to 80;

a is 1 or 2;

b is 3 when a is 1 or b is 4 when a is 2;

and x is a number defined by $0 \leq x < 0.7$.

2. The perovskite-type catalyst of claim 1, wherein said A comprises elements selected from the group consisting of lanthanides having an atomic number of from 57 to 71.

3. The perovskite-type catalyst of claim 1, wherein said single phase mixed lanthanide has a natural ratio of lanthanides.

4. The perovskite-type catalyst of claim 1, wherein said single phase mixed lanthanide has a modified ratio of lanthanides.

5. The perovskite-type catalyst of claim 1, wherein said single phase mixed lanthanide contains at least 4% of cerium oxide analyzed on a LnO basis.

6. The perovskite-type catalyst of claim 1, wherein said B is selected from a group consisting of Ca, Sr, and K cations.

7. The perovskite-type catalyst of claim 1, wherein M is selected from a group consisting of Fe, Mn, Co, Ni, Ru, Cr, and mixtures thereof.

8. The perovskite-type catalyst of claim 1, wherein said metal oxide compound is in the form of a pellet.

9. The perovskite-type catalyst of claim 1, wherein said metal oxide compound is in the form of a monolith.

10. The perovskite-type catalyst of claim 9, wherein said monolith is a honeycomb.

11. The perovskite-type catalyst of claim 1, wherein said metal oxide compound is in the form of an open cell foam.

12. The perovskite-type catalyst of claim 1, wherein said metal oxide compound is deposited on a carrier.

13. The perovskite-type catalyst of claim 12, wherein said carrier is a ceramic support.

14. The perovskite-type catalyst of claim 12, wherein said carrier is a ceramic honeycomb.

15. The perovskite-type catalyst of claim 1 having a general formula $Ln_{1-x}A_xMO_3$.

16. The perovskite-type catalyst of claim 15, wherein x is a number about 0.4 to 0.5.

17. The perovskite-type catalyst of claim 16 having a formula $Ln_{0.6}Ca_{0.4}CoO_3$.

18. The perovskite-type catalyst of claim 16 having a formula $Ln_{0.83}Sr_{0.17}MnO_3$.

19. The perovskite-type catalyst of claim 16 having a formula $Ln_{0.7}Sr_{0.3}CrO_3$.

20. The perovskite-type catalyst of claim 16 having a formula $Ln_{0.6}Ca_{0.4}Fe_{0.8}Mn_{0.2}O_3$.

21. The perovskite-type catalyst of claim 16 having a formula $Ln_{0.8}Sr_{0.2}Mn_{0.9}Ni_{0.04}Ru_{0.06}O_3$.

22. The perovskite-type catalyst of claim 16 having a formula $Ln_{0.8}K_{0.2}Mn_{0.95}Ru_{0.05}O_3$.

23. The perovskite-type catalyst of claim 16 having a formula $Ln_{0.7}Sr_{0.3}Cr_{0.95}Ru_{0.05}O_3$.

24. The perovskite-type catalyst of claim 16 having a formula $LnNiO_3$.

25. The perovskite-type catalyst of claim 1 having a formula $A_{2-x}B_xMO_4$.

26. The perovskite-type catalyst of claim 25 having a formula $Ln_2(Cu_{0.6}Co_{0.2}Ni_{0.2})O_4$.

27. A perovskite-type metal oxide compound represented by the general formula:

$$A_{a-x}B_xMO_b$$

wherein

A is a mixture of elements originally in the form of a single phase mixed lanthanide collected from bastnasite B is a divalent or monovalent cation;

M is at least one element selected from the group consisting of elements of an atomic number of from 22 to 30, 40 to 51, and 73 to 80;

a is 1 or 2;

b is 3 when a is 1 or b is 4 when a is 2;

and x is a number defined by $0 \leq x < 0.7$; and wherein said perovskite-type metal oxide compound having a B-site, and containing Mn on said B-site.

28. The perovskite-type metal oxide compound of claim 27, wherein said A comprises elements selected from the group consisting of lanthanides of an atomic number of from 57 to 71.

29. The perovskite-type metal oxide compound of claim 27 showing giant magnetoresistance effect.

30. The perovskite-type metal oxide compound of claim 29 having a formula $Ln_{0.83}Sr_{0.17}MnO_3$.

31. A method for preparing a perovskite-type catalyst consisting essential of a metal oxide composition having component elements represented by the general formula:

$$A_{a-x}B_xMO_b$$

wherein

A comprises a mixture of elements selected from the group consisting of yttrium and lanthanides of an atomic number of from 57 to 71;

B is a divalent or a monovalent cation;

M is at least one element selected from the group consisting of elements of an atomic number of from 22 to 30, 40 to 51, and 73 to 80;

a is 1 or 2;

b is 3 when a is 1 or b is 4 when a is 2;

and x is a number defined by $0 \leq x < 0.7$;

the method comprising:

forming a homogeneous mixture of a single phase mixed lanthanide salt and respective salts, or oxides of elements B and M, wherein said single phase mixed lanthanide salt is collected from bastnasite; and forming a perovskite-type metal oxide composition from said homogeneous mixture.

32. The method of claim 31, wherein said homogeneous mixture is formed by dissolving said single phase mixed lanthanide salt and said respective salts, or oxides of elements B and M in a solution.

33. The method of claim 31, wherein said homogeneous mixture is formed by grinding said single phase mixed lanthanide salt and said respective salts, or oxides of elements B and M together.

34. The method of claim 32, wherein said solution is water.

35. The method of claim 32 further comprising a step of adding acid to form a precipitate having a foam structure on heating, and calcining said precipitate to form said perovskite-type metal oxide composition.

36. The method of claim 35, wherein said acid is malic acid.

37. The method of claim 35, wherein said calcining step is carried out with periodic grinding and homogenizing to form a powder of said perovskite-type metal oxide composition.

38. The method of claim 33 further comprising a step of grinding an oxide of element M together with said precipitate to form a second mixture, and calcining said second mixture to form said perovskite-type metal oxide compound having multiple M elements.

39. The method of claim 33 further comprising a step of calcining said homogenous mixture with periodic grinding and homogenizing to form said powder of said metal oxide compound.

40. The method of claim 31 further comprising a step of forming said perovskite-type metal oxide compound into a pellet.

41. The method of 40, wherein said pellet is formed by using uniaxial cold press.

42. The method of claim 31, wherein said single phase lanthanide salt contains a natural ratio of lanthanides.

43. The method of claim 31, wherein said single phase lanthanide salt contains a modified ratio of lanthanides.

44. The method of claim 31, wherein said single phase lanthanide salt is collected from a bastnasite concentrate.

45. The method of claim 44, wherein said single phase lanthanide salt is lanthanide (Ln) carbonate having a natural ratio of lanthanides.

46. The method of claim 31, wherein said single phase lanthanide salt is collected from a La concentrate.

47. The method of claim 46, wherein said single phase lanthanide salt is selected from a group consisting of a mixed hydrated lanthanide carbonate, and a mixed hydrated lanthanide nitrate.

48. The method of claim 31, wherein said single phase lanthanide salt comprising at least 4% of cerium oxide analyzed on a LnO basis.

49. The method of claim 31, wherein said single phase lanthanide salt is selected from a group consisting of nitrates, carbonates, acetates, oxalates, or chlorides of lanthanide.

50. The method of claim 31, wherein said salts of elements B and M are selected from a group consisting of nitrates, carbonates, acetates, oxalates, or chlorides.

51. The method of claim 31 further comprising a step of forming said perovskite-type metal oxide compound into a monolithic body.

52. The method of claim 51, wherein said monolithic body is a honeycomb.

53. The method of claim 31 further comprising a step of forming said perovskite-type metal oxide compound into an open cell foam.

54. The method of claim 31 further comprising a step of forming said perovskite-type metal oxide compound into an open cell foam.

55. The method of claim 31 further comprising a step of depositing said perovskite-type metal oxide compound on a carrier.

56. The method of claim 55, wherein said carrier is a ceramic support.

57. The method of claim 55, wherein said carrier is a ceramic honeycomb.

* * * * *